United States Patent [19]
Marsh et al.

[11] Patent Number: 5,557,280
[45] Date of Patent: Sep. 17, 1996

[54] SYNCHRONIZED ELECTRONIC IDENTIFICATION SYSTEM

[75] Inventors: Michael J. C. Marsh, Johannesburg; Clinton A. Van Zyl, Pretoria, both of South Africa

[73] Assignee: British Technology Group Limited, London, United Kingdom

[21] Appl. No.: 111,430

[22] Filed: Aug. 25, 1993

[30] Foreign Application Priority Data

Aug. 26, 1992 [ZA] South Africa ................ 92/6446

[51] Int. Cl.$^6$ ................... G01S 13/76; G01S 13/79
[52] U.S. Cl. ................................ 342/044; 342/51
[58] Field of Search ................ 342/42, 44, 50, 342/51

[56] References Cited

U.S. PATENT DOCUMENTS

| | | | |
|---|---|---|---|
| 3,623,090 | 11/1971 | Gilbert et al. | 342/29 |
| 3,665,464 | 5/1972 | Meilander | 342/36 |
| 3,714,650 | 1/1973 | Fuller et al. | 342/42 |
| 3,766,552 | 10/1973 | Hajduk | 342/37 |
| 3,832,690 | 8/1974 | McVoy et al. | 343/754 |
| 4,072,946 | 2/1978 | Kneefel | 342/42 |
| 4,128,835 | 12/1978 | Russell | 342/46 |
| 4,454,510 | 6/1984 | Crow | 342/455 X |
| 4,630,035 | 12/1986 | Stahl et al. | 340/539 |
| 4,649,297 | 9/1987 | Sewards | 342/45 |
| 4,839,656 | 6/1989 | O'Neill et al. | 342/357 |
| 5,144,313 | 9/1992 | Kirknes | 342/44 |
| 5,235,326 | 8/1993 | Beigel et al. | 340/825.54 |
| 5,245,332 | 9/1993 | Katzenstein | 340/825.54 |
| 5,245,346 | 9/1993 | Nishimura et al. | 342/42 |
| 5,278,563 | 1/1994 | Spiess | 342/44 |
| 5,311,185 | 5/1994 | Hochstein et al. | 342/44 |
| 5,345,231 | 9/1994 | Koo et al. | 340/870.31 |
| 5,349,355 | 9/1994 | Longas et al. | 342/42 |

FOREIGN PATENT DOCUMENTS

| | | |
|---|---|---|
| 0161779 | 11/1985 | European Pat. Off. . |
| 0316524 | 5/1989 | European Pat. Off. . |
| 2621134 | 3/1989 | France . |
| 92/0039 | 1/1992 | South Africa . |

*Primary Examiner*—John B. Sotomayor
*Attorney, Agent, or Firm*—Lowe, Price, LeBlanc & Becker

[57] ABSTRACT

The invention relates to an identification system comprising an interrogator and a plurality of transponders. The interrogator includes transmitter means for transmitting an interrogation signal to the transponder, receiver means for receiving a response signal from the transponder, and processor means for identifying the transponder from data in the response signal. Clock extraction means are further provided for extracting a transponder clock signal from the response signal which is used to synchronise the modification of the interrogation signal with the response signal from the transponder. Each transponder comprises receiver means for receiving the interrogation signal, a transponder clock generator, a code generator, transmitter means, and a modulator connected to the code generator, so that on receipt of the interrogation signal the transponder transmits a response signal containing data which identifies the transponder. The interrogator is adapted to detect successful reception of a response signal from any transponder, to derive a synchronisation signal from the response signal of that transponder, and to modify the interrogation signal synchronously with the response signal to indicate successful reception of the response signal. Each transponder further includes means responsive to a respective modification of the interrogation signal to cease transmission of its response signal.

32 Claims, 9 Drawing Sheets

TRANSPONDER OPERATION

SYNCHRONIZED ELECTRONIC IDENTIFICATION SYSTEM

BACKGROUND OF THE INVENTION

This invention relates to an identification system comprising an interrogator and a plurality of transponders.

South African Patent application No. 92/0039 describes an identification system which comprises an interrogator and a number of individual transponders, each transponder being associated with an article to be identified. The articles to be identified may be vehicles, items of stock in a supermarket or warehouse, or humans, for example.

In the system described in the abovementioned patent application, it is possible under extreme circumstances that the signal from one transponder which is relatively far away from the interrogator could be swamped by the signal from a nearby transponder, leading to non-identification of the transponder which is further away.

It is an object of the invention to improve the reliability of transponder identification in a system of the kind referred to above.

SUMMARY OF THE INVENTION

According to the invention an identification system comprises an interrogator and a plurality of transponders, the interrogator including transmitter means for transmitting an interrogation signal to the transponder, receiver means for receiving a response signal from the transponder, and processor means for identifying the transponder from data in the response signal; each transponder comprising receiver means for receiving the interrogation signal, a transponder clock generator, a code generator, transmitter means, and a modulator connected to the code generator, so that on receipt of the interrogation signal the transponder transmits a response signal containing data which identifies the transponder, the interrogator being adapted to detect successful reception of a response signal from any transponder, to derive a synchronisation signal from the response signal of that transponder, and to modify the interrogation signal synchronously with the response signal to indicate successful reception of the response signal, each transponder including means responsive to a respective modification of the interrogation signal to cease transmission of its response signal.

Preferably, the interrogator includes clock extraction means for extracting a clock signal from the response signal which is used to synchronise the modification of the interrogation signal with the response signal.

The clock extraction means may be adapted to generate a pseudo transponder clock signal which follows the frequency of the extracted transponder clock signal.

Preferably, the clock extraction means includes a voltage controlled oscillator which generates the pseudo transponder clock signal, and extracted clock monitor means which monitors the presence of the extracted transponder clock signal and which controls the voltage controlled oscillator to maintain the frequency of the pseudo transponder clock signal constant in the absence of the extracted transponder clock signal.

The interrogator may include timing reference means arranged to generate an output voltage for controlling the voltage controlled oscillator, the output voltage being related initially, when a transponder response signal is received, to the value of a synchronisation code in the transponder response signal.

The timing reference means may be arranged to generate a voltage ramp, the voltage value reached by the ramp being related to the duration of a synchronisation bit in the transponder response signal.

The interrogator may be adapted to modify the interrogation signal for a first predetermined number of transponder clock periods, a second predetermined number of transponder clock periods after successful reception of the transponder response signal by the interrogator.

In a preferred embodiment the interrogation signal is modified by being interrupted.

The transponder may include logic circuitry arranged to monitor the modification of the interrogation signal and to cause the transponder to cease transmission of its response signal only if the modification of the interrogation signal has a duration related to the duration of a predetermined number of transponder clock periods.

The logic circuitry may be arranged to monitor the modification of the interrogation signal over a period corresponding to a single transponder clock period.

The interrogator may be adapted to modify the interrogation signal at least a second time for a third predetermined number of transponder clock periods, a fourth predetermined number of transponder clock periods after successful reception of the transponder response signal by the interrogator.

The transponder preferably includes control means arranged to detect the second modification of the interrogation signal and to disable the transponder for a predetermined time after the transponder ceases to receive the interrogation signal.

The predetermined time is preferably determined by a timing circuit comprising a charge storage device which is arranged to be charged by energy derived from the interrogation signal, and to be discharged at a controlled rate after the transponder ceases to receive the interrogation signal.

The modification of the interrogation signal preferably comprises a transition which occurs at a controlled rate to keep the maximum frequencies generated by the transition within an acceptable range.

In an alternative embodiment of the system, particularly suitable for use in anti-theft applications, the means responsive to a modification of the interrogation signal is adapted to disable the transponder for a predetermined period of time.

This allows a transponder attached to an article in a retail outlet to be disabled at a till or check-out, so that it does not respond to interrogation signals from an interrogator at an exit.

Further according to the invention there is provided a transponder for use in the system defined above, the transponder comprising receiver means for receiving an interrogation signal, a transponder clock generator, a code generator, transmitter means, and a modulator connected to the code generator, so that on receipt of the interrogation signal the transponder transmits a response signal containing data which identifies the transponder, the transponder further comprising means responsive to a respective modification of the interrogation signal synchronous with the response signal and indicating successful identification of the transponder from its response signal to cease transmission of its response signal.

The transponder may include logic circuitry arranged to monitor the modification of the interrogation signal and to cause the transponder to cease transmission of its response signal only if the modification of the interrogation signal has a duration related to the duration of a predetermined number of transponder clock periods.

Preferably, the transponder logic circuitry is arranged to monitor the modification of the interrogation signal over a period corresponding to a single transponder clock period.

The means responsive to a modification of the interrogation signal may be adapted to disable the transponder for a predetermined period of time.

The transponder may include control means arranged to detect a second modification of the interrogation signal and to disable the transponder for a predetermined time after the transponder ceases to receive the interrogation signal.

The predetermined time may be determined by a timing circuit comprising a charge storage device which is arranged to be charged by energy derived from the interrogation signal, and to be discharged at a controlled rate after the transponder ceases to receive the interrogation signal.

DESCRIPTION OF EMBODIMENTS

Figure 1:
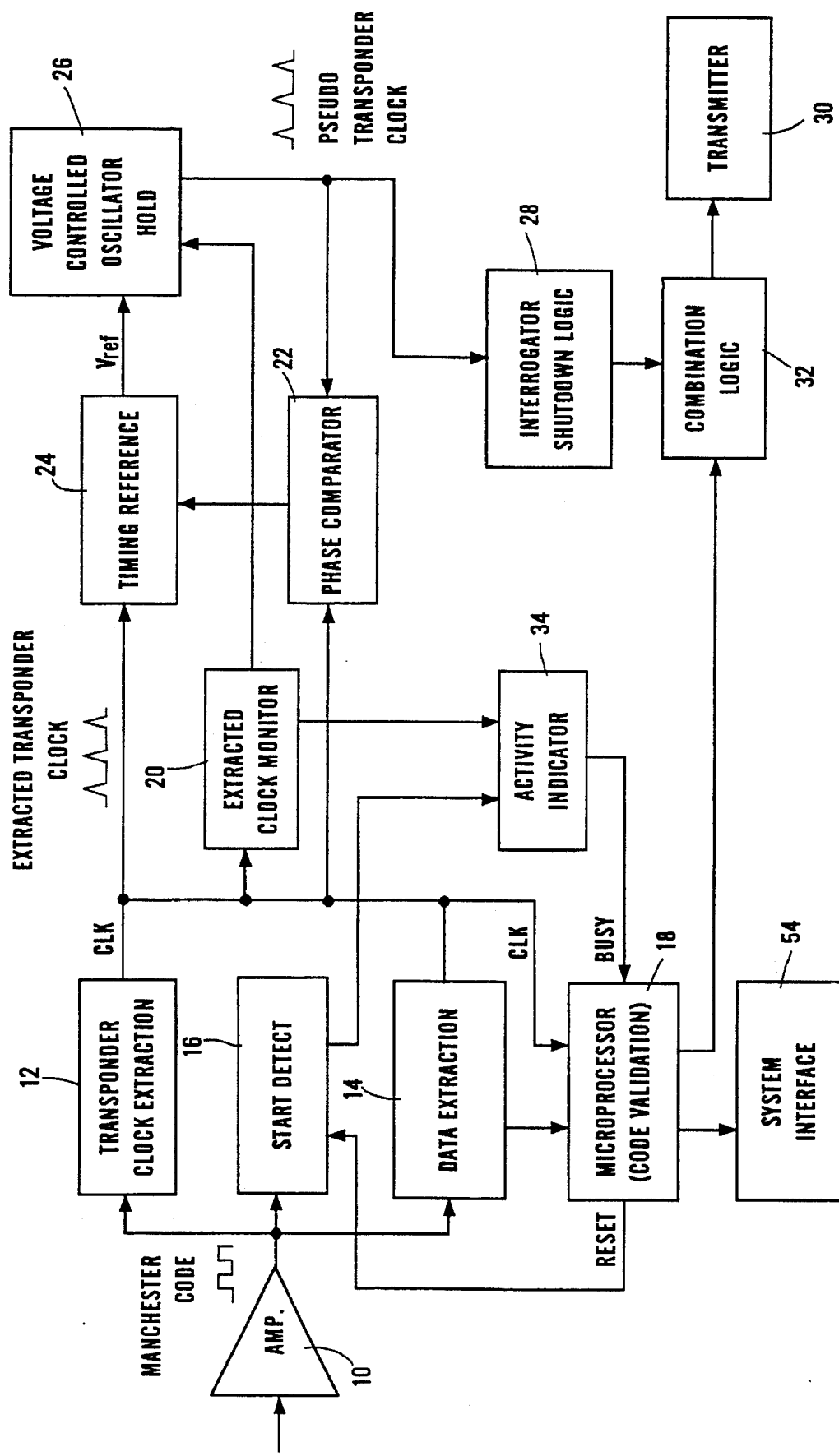
FIG. 1 is a simplified block schematic diagram of an interrogator according to the invention.

This invention relates to an identification system similar to that described in South African Patent Application No. 92/0039, the contents of which are incorporated herein by reference. One example of the identification system comprises an interrogator or reader which transmits interrogation signals at a power of approximately 15 W and at a frequency of approximately 915 MHz to a number of passive transponders. The transponders derive a power supply from energy in the interrogation signal, and modulate a portion of the energy received from the interrogator with an identification code to generate a response signal, which is transmitted back to the interrogator.

The transponder can use separate receiver and transmitter antennas, or a single antenna can be utilised for both reception and transmission. The response signal can be generated by modulating the reflectivity of such an antenna, instead of using a modulator to redirect energy from the receiver antenna to the transmitter antenna. Alternatively, the transponder can be independently powered and may generate its own response signal.

The system described in the abovementioned patent application provides for each transponder to wait for a random or pseudo-random period after receiving an interrogation signal from the interrogator, before transmitting its own response signal. Successful identification of any transponder is indicated by a brief interruption or other modification of the interrogation signal, following closely on the successful reception of a response signal of any particular transponder. This acts as a turn-off signal to the relevant transponder. The random or pseudo-random delay in the generation of response signals, in response to repeated interrogation signals, ensures that all transponders will eventually be identified by the interrogator.

Normally, if two transponders transmit respective response signals substantially simultaneously, the interrogator will not successfully identify either of the transponders, due to interference between the response signals. In response to a subsequent interrogation signal, the two transponders will transmit further response signals with respective new random or pseudo-random delays, and will then be detected. However, in an extreme case of the above situation, one of the two transponders may be much closer to the interrogator than the other, so that its response signal swamps the simultaneously transmitted response signal of the other. In this situation, the interrogator may successfully receive the response signal of the nearer of the two transponders, and will then indicate successful reception of that response signal by modifying its interrogation signal, to instruct the nearer transponder to turn itself off. This may be interpreted by both transponders to mean that their respective response signals have been successfully received, so that they both shut off. This will result in the second transponder not being counted.

In order to address the above worst case scenario, and generally to improve the reliability of detection of transponders of this kind, the interrogator includes a synchronisation circuit which extracts a clock signal from a successfully received transponder response signal, and which synchronises the interruption of the interrogation signal which is used to confirm successful reception of a response signal with the operation of the relevant transponder. Because each transponder has its own internal clock, the frequency of which depends on the power supply voltage derived from the interrogation signal, as well on the tolerance of the clock components in the transponder, the clock frequencies of different transponders vary relatively widely. Thus, by synchronising the shutting off of the interrogation signal with the clock frequency of the relevant transponder, the chance of another transponder having transmitted its response signal substantially simultaneously, and also having a substantially identical clock frequency, is made remote. This improves the reliability of detection substantially.

FIG. 1 shows the synchronisation circuit of the interrogator. The circuit includes an amplifier 10 which amplifies the received response signal from the transponder which is responding to an interrogation signal from the interrogator. This signal carries a transponder identification code in a Manchester code format. The signal is fed to a transponder clock extraction circuit 12, a data extraction circuit 14, and a start detect circuit 16. The extracted data and the extracted clock are sent to a microprocessor 18 for code validation along with a "Busy" signal from an activity indicator circuit 34, which is generated when both the start detect circuit 16 and an extracted clock monitor circuit 20 provide an output, indicating that the hardware is busy processing a received code. The start detect circuitry 16 monitors the output of the amplifier 10 to determine when a transponder response code starts by looking for the quiet bits at the start of a received code, and provides an output to the activity indicator circuit 34 when these quiet bits are detected. If the activity indicator circuit simultaneously receives an output from the extracted clock monitor circuit 20, it sends a "Busy" signal to the microprocessor to initiate a decoding cycle.

The clock extraction circuit 12 monitors all the transitions in the received Manchester code, only allowing the transitions occurring within a certain tolerance about the middle of the bit period to generate clock pulses. The output pulse train of the transponder clock extraction circuit 12 is fed to a phase comparator circuit 22 and compared with the output of a voltage controlled oscillator (VCO) 26 in order to modify a timing reference voltage ($V_{ref}$) held at the output of the timing reference circuit. This reference enables the VCO 26 to generate a "pseudo transponder clock" frequency locked to the extracted transponder clock frequency at the time the last bit of the transponder code was sent. At the same time the extracted clock monitoring circuit 20 monitors the extracted clock. When the last bit of the transponder code has been received no more transponder clock pulses can be extracted and the extracted clock monitor circuit 20 signals the VCO 26 to hold its present output frequency, corresponding to the transponder clock frequency at the time of transmission of the last bit of data from the transponder.

The output of the VCO 26 is fed to an interrogator shutdown logic circuit 28 which controls the operation of the interrogator's transmitter circuitry 30, in conjunction with a "Valid code" signal from the microprocessor 18 via a logic circuit 32. On successful reception of the response signal by the interrogator, the interrogation signal is modified in order to notify the relevant transponder that its response was received and that it must cease further transmissions of its code.

Figure 2:
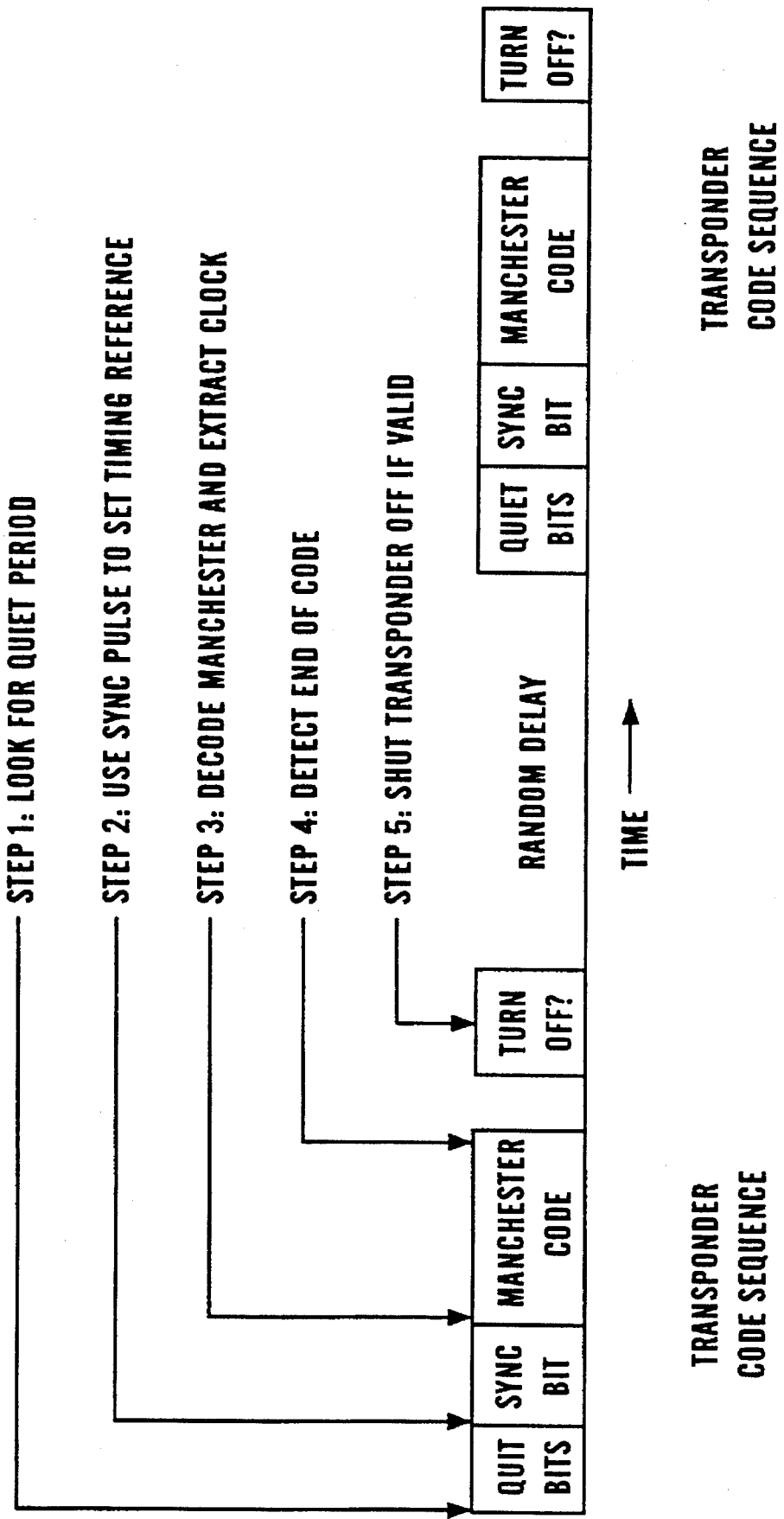
FIG. 2 is a diagram indicating schematically the basic operation of a transponder of the invention.

The operation of a transponder is shown schematically in FIG. 2. When the transponder receives an interrogation signal, it modulates its own identification code onto the interrogation signal and transmits a response signal back to the interrogator. The transponder internal logic then monitors the interrogation signal for a "turn-off" instruction, represented by a brief interruption in the interrogation signal. If the turn-off instruction is defected, the transponder ceases its transmission. If no turn-off instruction is detected, the transponder outputs its identification code again, after a random or pseudo-random delay, in response to the next interrogation signal, and the process is repeated.

The code transmitted by a transponder, as shown in FIG. 2, is comprised of a number of quiet bits, followed by a synchronisation bit, followed in turn by the Manchester code containing the transponder identification data. A quiet bit is a bit period where nothing (logic LOW) is transmitted and should be distinguished from a Manchester ZERO bit, in which a LOW is transmitted in the first half of the bit period and a HIGH during the second half. In Manchester code a positive or negative transition always occurs in the middle of the bit period. This fact is used by the interrogator synchronisation circuit to extract the clock used to generate the Manchester code in the transponder. The synchronisation (sync) bit is a logic ONE bit, which when transmitted in Manchester format is combined with the clock in such a way that the Manchester bit is HIGH in the first half of the bit and LOW in the second half of the bit when the quiet period is LOW. Since the timing reference is derived from measuring the pulse width in the first half of the Manchester representation of the sync bit it is important that this pulse occurs in the first half of the bit and not in the second half of the bit.

Figure 3:
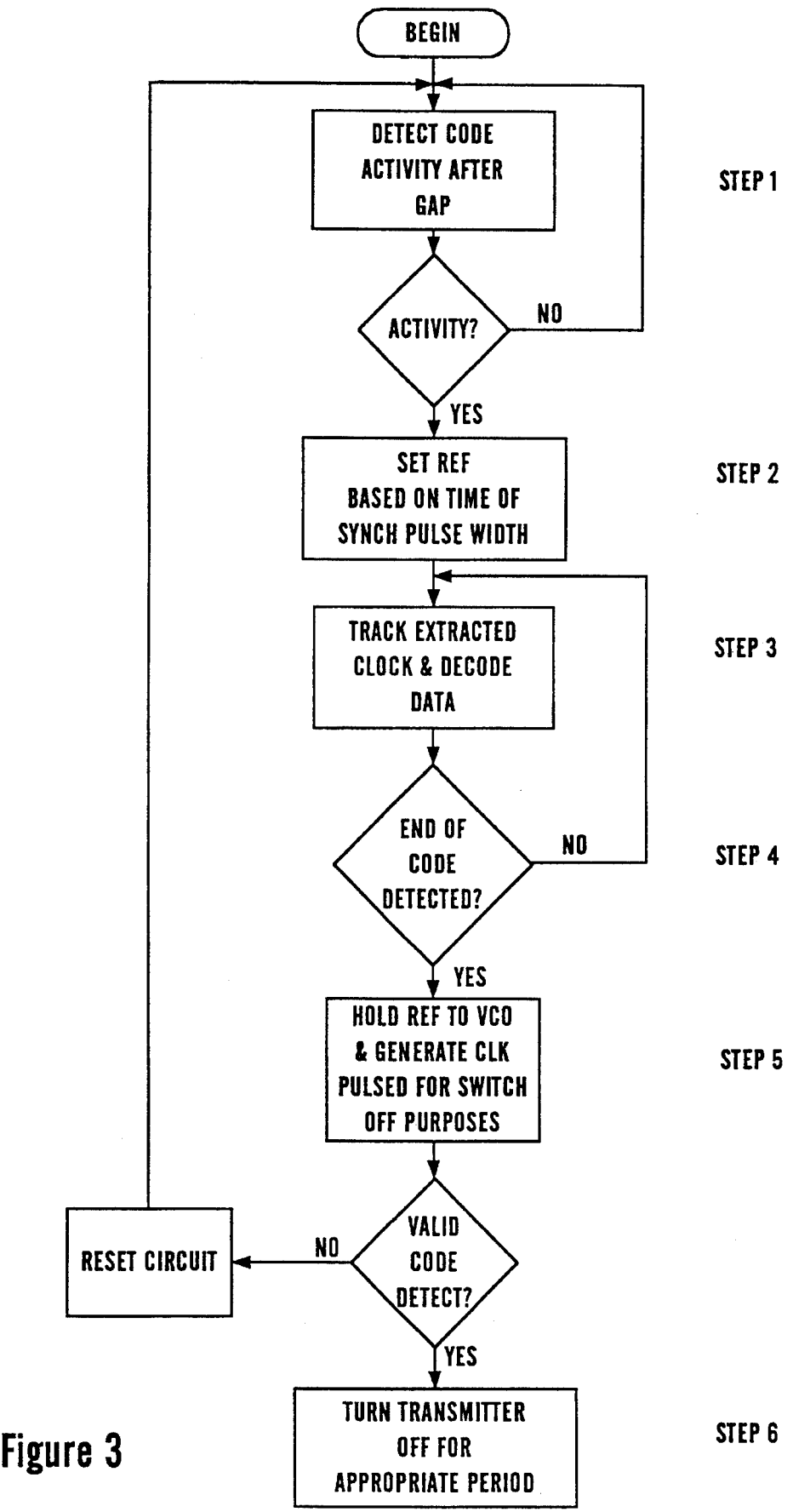
FIG. 3 is a flow chart illustrating the operation of the interrogator of FIG. 1 in use.
Figure 4:
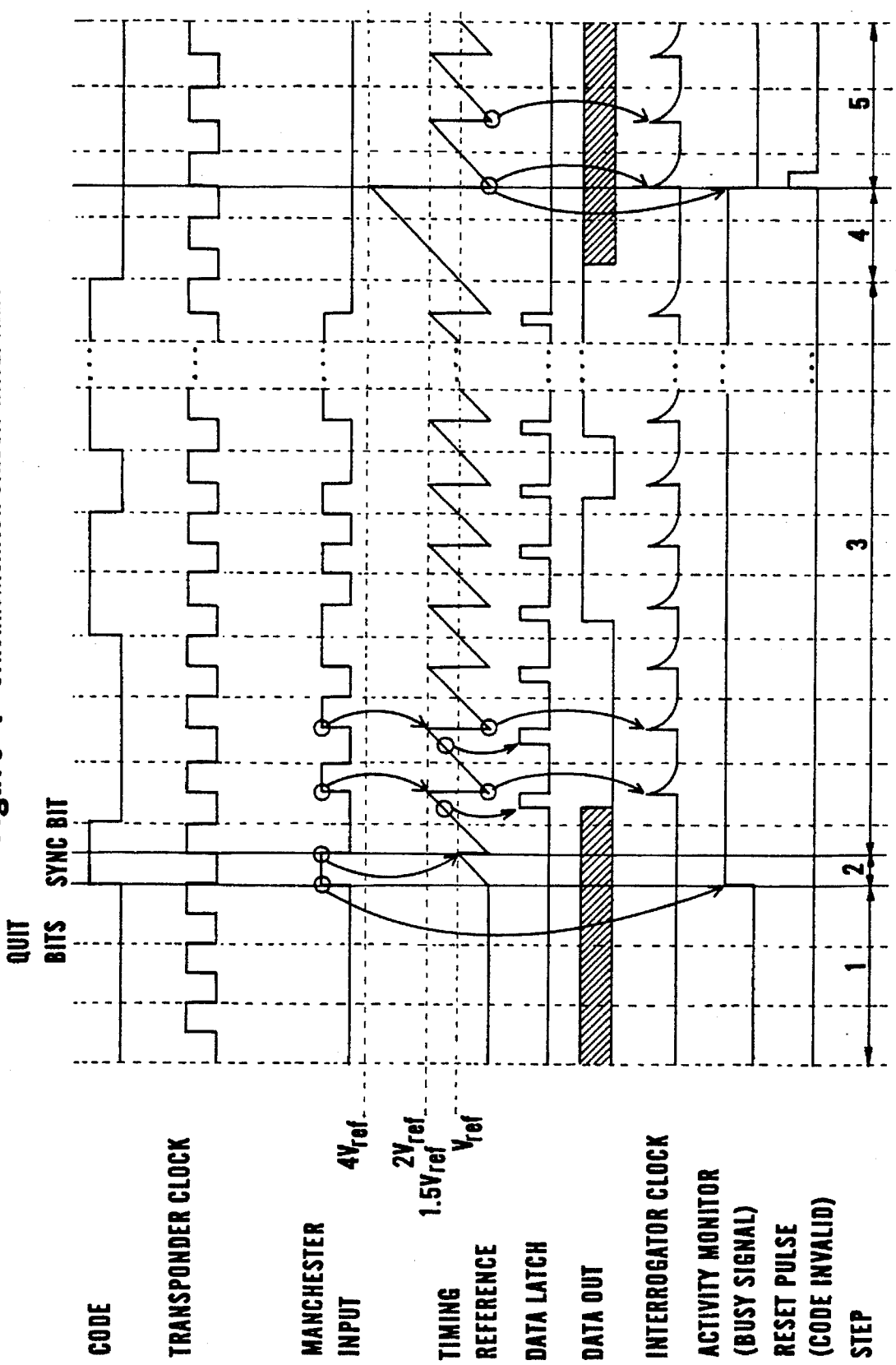
FIG. 4 is a timing diagram illustrating the waveforms found in various parts of the interrogator circuitry.

The flow diagram of FIG. 3 shows the steps that the interrogator hardware goes through, while some of the associated waveforms are shown in FIG. 4.

Step 1: The output of the amplifier 10 is monitored for the quiet bits in order to find the start of the transponder identification code. The first bit sent after the quiet bits is a synchronisation bit which is used to determine the period and hence the frequency of the code. A busy signal from the activity indicator 34 is sent to the microprocessor 18 to indicate the start of a decode cycle.

Step 2: A constant current source in the timing reference circuit 24 generates a timing reference ramp voltage $V_{ref}$ which is sampled for the duration of the sync pulse and then held. This reference voltage relates directly to the clock frequency of the code.

Step 3: The timing reference ramp voltage is continuously generated and the voltage compared to a weighted version of the reference. The waveforms shown in FIG. 4 show how at 1.5 times the reference voltage the data is latched and at twice the reference voltage the clock is generated which is used by the microprocessor 18 to read the data at the output of the data extraction circuit 14. The timing reference ramp is reset when the extracted clock pulse occurs within the accepted tolerance around twice the reference voltage. The ramp is sampled and held when the clock occurs and compared to the reference which is modified in order to track the clock frequency of the transponder.

Step 4: When no more clock pulses are received (after the last code bit has been decoded) the ramp is not reset and proceeds to a voltage four times the reference, which activates step 5.

Step 5: At this point the extracted clock monitoring circuit 20 outputs a "hold" signal to the VCO 26 which holds the timing reference voltage at its present value, so that the VCO continues to generate its present output frequency. If the microprocessor determines that the decoded code is valid it enables the interrogator shutdown logic to indicate to the transponder it has been successfully identified. If it is not a valid code, the microprocessor 18 will reset the circuit by sending a "reset" signal to the start detect circuit 16 and it will begin looking for the next code.

Step 6: The interrogator signal is modified in order to indicate to the relevant transponder that it has been successfully identified. In the present embodiment this is achieved by turning off the transmitter 30 for a short period in the precise way described below.

Figure 5:
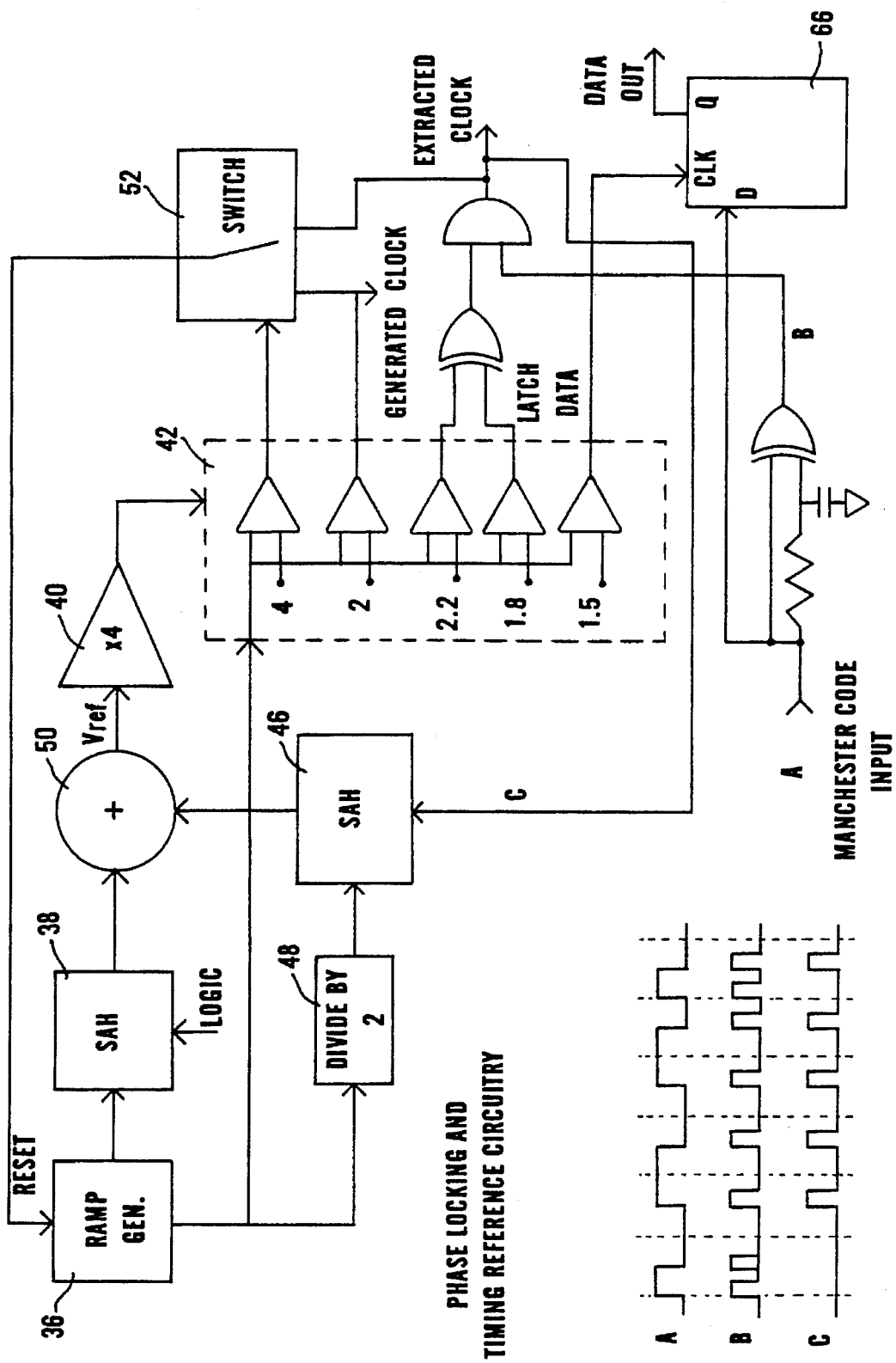
FIG. 5 is a schematic diagram of synchronisation circuitry of the interrogator circuit of FIG. 1.

FIG. 5 shows in more detail how the phase locking and clock extraction process occurs. The start detect circuitry 16 monitors the Manchester code at the output of the amplifier 10 and indicates code activity, which starts the reference acquisition step 2. The output of a ramp generator 36 is sampled and held by a sample and hold circuit 38 at the end of the sync pulse. This reference voltage ($V_{ref}$) is multiplied by four by an amplifier 40 and used to generate a number of different reference levels by means of a divider and comparator network 42. The timing ramp is continuously generated and compared to the reference network in order to determine what action to take. At 1.5 times the held reference voltage we are in the first half of a Manchester bit period, and the state is latched into a D-type flip-flop 66. When the state transition occurs within its tolerance (1.8 $V_{ref}$–2.2 $V_{ref}$) in the middle of the bit period, the extracted clock pulse is generated. This pulse is used by the microprocessor 18 to read the latched output of the D-type flip-flop. This action is repeated for the duration of the code end the associated extracted clock. These generated references are based on the fact that the held reference voltage is proportional to a pulse width of half a bit period measured in the first half of the sync bit period.

When a clock pulse occurs a phase comparator sample and hold circuit 46 samples and holds the value of the timing reference ramp and compares this, after dividing it by two in a divider circuit 48, to the held timing reference ($V_{ref}$). If any difference occurs a portion of the difference is combined by an adder 50 with the reference ($V_{ref}$) in order to pull the reference, and hence the generated clock frequency, towards the new value of the extracted transponder clock frequency. When the code ends no further clock can be extracted resulting in the ramp generator 36 not being reset. The ramp voltage then reaches four times $V_{ref}$ and the output of the comparator 42 operates a logic switch 52 which resets the ramp generator 36 and proceeds to generate pseudo clock pulses at twice the updated timing reference period ($V_{ref}$).

The microprocessor 18 reads the data out signal on each clock pulse and determines the validity of the code by means of an error detection algorithm. In the present embodiment a simple parity check algorithm is used. If the code passes the check the microprocessor allows the interrogator shut-down logic to modify the interrogator signal and sends the code on to the processing circuitry of the interrogator system via a system interface 54.

Figure 6:
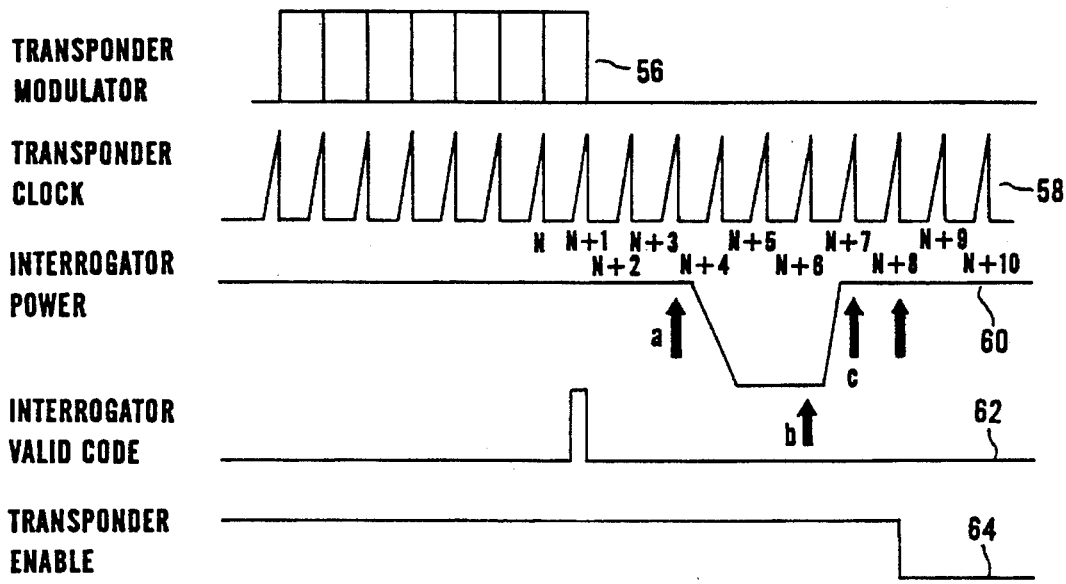
FIG. 6 is a timing diagram illustrating the operation of a first version of the identification system, showing the interaction of a transponder and the interrogator.

Referring now to FIG. 6, a waveform diagram shows diagrammatically how the interrogator synchronises its brief shut-down or "turn-off" signal with the operation of the transponder. The diagram of FIG. 6 shows a modulation signal 56 which is generated by the transponder, and which finishes on period N+1 of the transponder clock waveform 58. Two clock periods later, at clock period N+3, the transponder logic circuitry checks that the interrogation signal is still being received. Immediately after the transponder clock period N+3 the interrogator shuts off its interrogation signal, reducing its output power 60 to zero, and remains off until the end of the transponder clock period N+6. At the end of the clock period N+6, the transponder logic checks that the interrogation signal is still absent. The interrogation signal is then restored to full power. At clock period N+7, the transponder logic checks whether the interrogation signal is present again. The check is repeated at clock period N+8. If all of the checks are correct, the transponder decides that the turn-off signal from the interrogator applies to it, and disables the transmission of further response signals. The transponder remains off until such time as the interrogation signal has remained off for a predetermined time, allowing the resetting of all transponders, and until the interrogation signal is restored subsequently.

The waveform 62 in FIG. 6 is a pulse generated by the data extraction and code validation circuits of the interrogator on detection of a valid response signal code from a transponder, while the waveform 64 is a transponder enable signal generated by the internal logic circuitry of the transponder. As can be seen from the diagram, the transponder enable signal changes state at the end of the transponder clock period N+8, after confirmation of the turn-off signal from the interrogator.

To avoid generating undesired radio frequency interference, the interrogation signal is not shut-off or restored instantaneously, but is shut-off and restored at a controlled rate by the interrogator shut-down logic circuit 28 over at least one transponder clock period, as shown in FIG. 6. The rise time and fall time of the turn-off/turn-on sequence are controlled to keep the maximum frequencies generated by the transitions within an acceptable range. This is achieved by a filter circuit at the input of the transmitter 30 which limits the rise and fall times of the driving signal applied to the transmitter input.

The transponder monitors a "rising edge" at the end of the interrogator turn-off signal rather than a falling edge, since the characteristics of the latter tend to vary more with variations in system capacitance and other component values, and with the power drawn by the transmitter.

The result of the above described techniques is that the "turn-off" window in the interrogation signal which is monitored by each transponder is effectively only one clock period wide (that is, the clock period between N+6 and N+7), which reduces the likelihood of two transponders both transmitting and shutting down simultaneously. In a system comprising one thousand transponders, the likelihood of error is reduced to approximately 0.01%.

In certain applications, it may be necessary for the transponders to be interrogated more than once, with short time intervals between interrogations, and subsequently for them to be interrogated at longer time intervals. An example of such an application arises when transponders of the invention are used to identify items of stock in a supermarket. When a delivery vehicle arrives at the supermarket, the contents of the vehicle are scanned by an interrogator, and the resulting print-out or display is compared with a delivery invoice or inventory. If any discrepancies are noted, the interrogation process may need to be repeated in a relatively small space of time. This procedure operates as described above.

At the supermarket check-out, when a customer has filled a trolley with various items, each bearing a transponder, the transponders are reactivated and read by an interrogator connected to a till. In order to prevent theft in the case of a self-service check-out, the interrogator sends a supplementary turn-off signal to the transponder to turn it off for a length of time after it has been removed from the interrogation field. At the exit of the supermarket a security check-out is located, capable of detecting any transponders which have not been rendered inactive by this procedure. Some time after the customer has left the supermarket, the transponders become active once more, allowing them to be used at home. For example, a customer could have an interrogator at home, which could be used to read the contents of a pantry, to determine which items need to be re-purchased. (Otherwise, the transponders can be removed or destroyed after they have passed through the check-out).

In order to implement this aspect of the invention, the transponder is designed to look for two turn-off signals in succession. The transponder responds to the first turn-off signal as described above. When this turn-off signal is detected, the transponder ceases further transmissions as long as it remains in the interrogator's field. The transponder now looks for a second turn-off signal. If this second turn-off signal is detected, the transponder charges up a capacitor, using energy from the interrogation signal, which disables the code generator circuitry of the transponder for a predetermined period (say, ten minutes) after the transponder has been removed from the interrogator's field.

Figure 8:
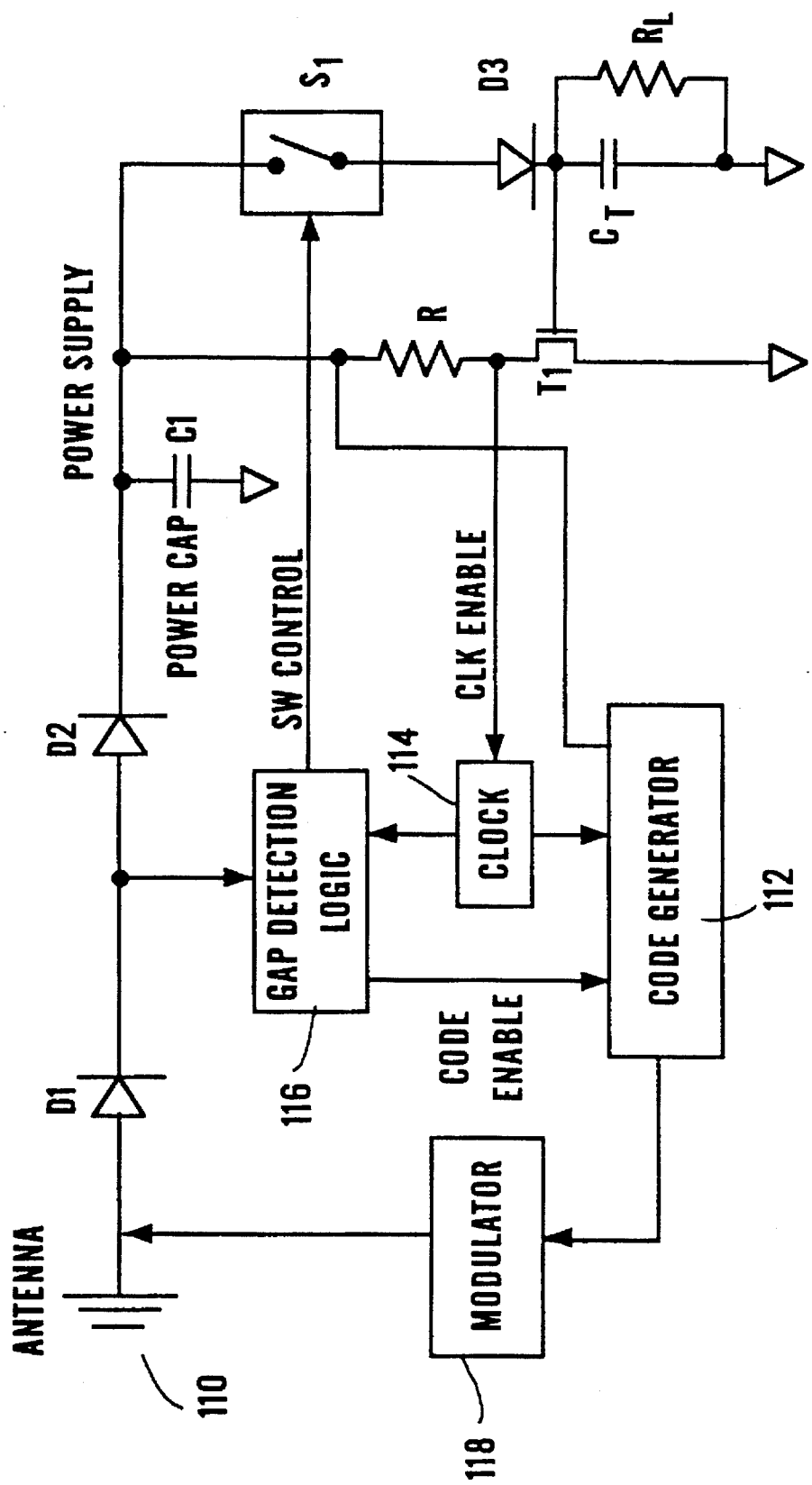
FIG. 8 is a simplified block schematic diagram of a transponder according to a second embodiment of the invention.

FIG. 8 shows an example of a transponder which is able to respond to dual turn-off signals. The transponder comprises a receive/transmit antenna 110, the output of which is fed via diodes D1 and D2 to a power supply capacitor C1. When the capacitor C1 is sufficiently charged, the transponder circuitry is activated, and the transponder begins to transmit its identification code as described above. The power supply from the capacitor C1 powers a code generator circuit 112 and a clock generator circuit 114 which receives a "clock enable" signal via a resistor R. The code generator, which in normal operating mode is enabled by a "code enable" signal from a gap detection logic circuit 116, sends its output to a modulator circuit 118, which modulates the transponder identification code from the code generator 112 onto the interrogation signal, at a clock frequency determined by the clock generator circuit 114.

Figure 7:
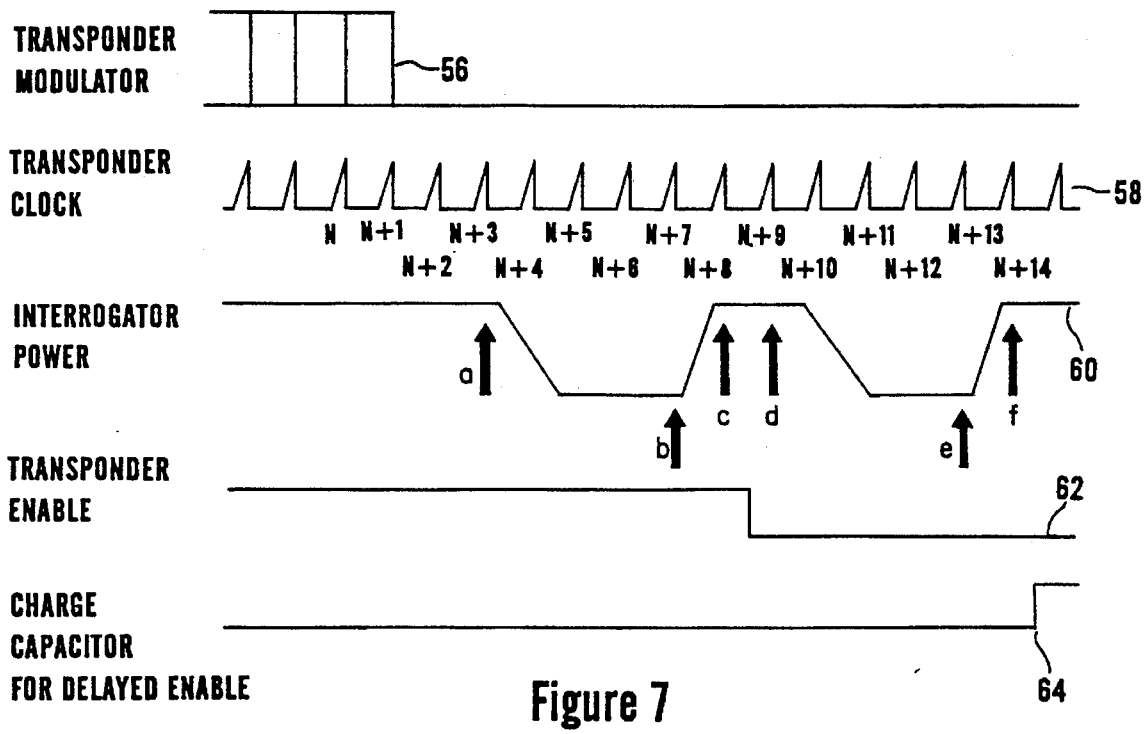
FIG. 7 is a timing diagram of a second embodiment of the identification system.

If the response signal from the transponder is successfully detected by the interrogator, the interrogator transmits a first turn-off signal, as shown in FIG. 7, between transponder clock periods N+3 and N+8. This interruption in the interrogation signal is detected by the gap detection logic circuit 116 and the "code enable" signal is removed from the code generator, disabling the transponder. The gap detection logic circuit 116 now monitors the interrogation signal for a second turn-off signal, which in FIG. 7, occurs between transponder clock periods N+10 and N+14. If this second turn-off signal is detected, the gap detection logic circuit 116 sends a switch control signal to a controllable switch S1, closing the switch. This allows a timing capacitor $C_T$ to charge up via a diode D3. When this capacitor has reached a predetermined level of charge, it turns on a field effect transistor T1, removing the "clock enable" signal from the clock generation circuit 114. This disables the transponder, and the transponder remains in this state until it is removed from the interrogator's field. When this happens, the timing capacitor $C_T$ is discharged through a parallel leakage resistor $R_L$. Once the timing capacitor $C_T$ has discharged fully, the transponder will again operate normally, and will respond to interrogation signals. However, if the transponder is moved into an interrogation field at any time while the capacitor $C_T$ is still charged, the clock generation circuit 114 will continue to be disabled, inhibiting operation of the transponder.

Figure 9:
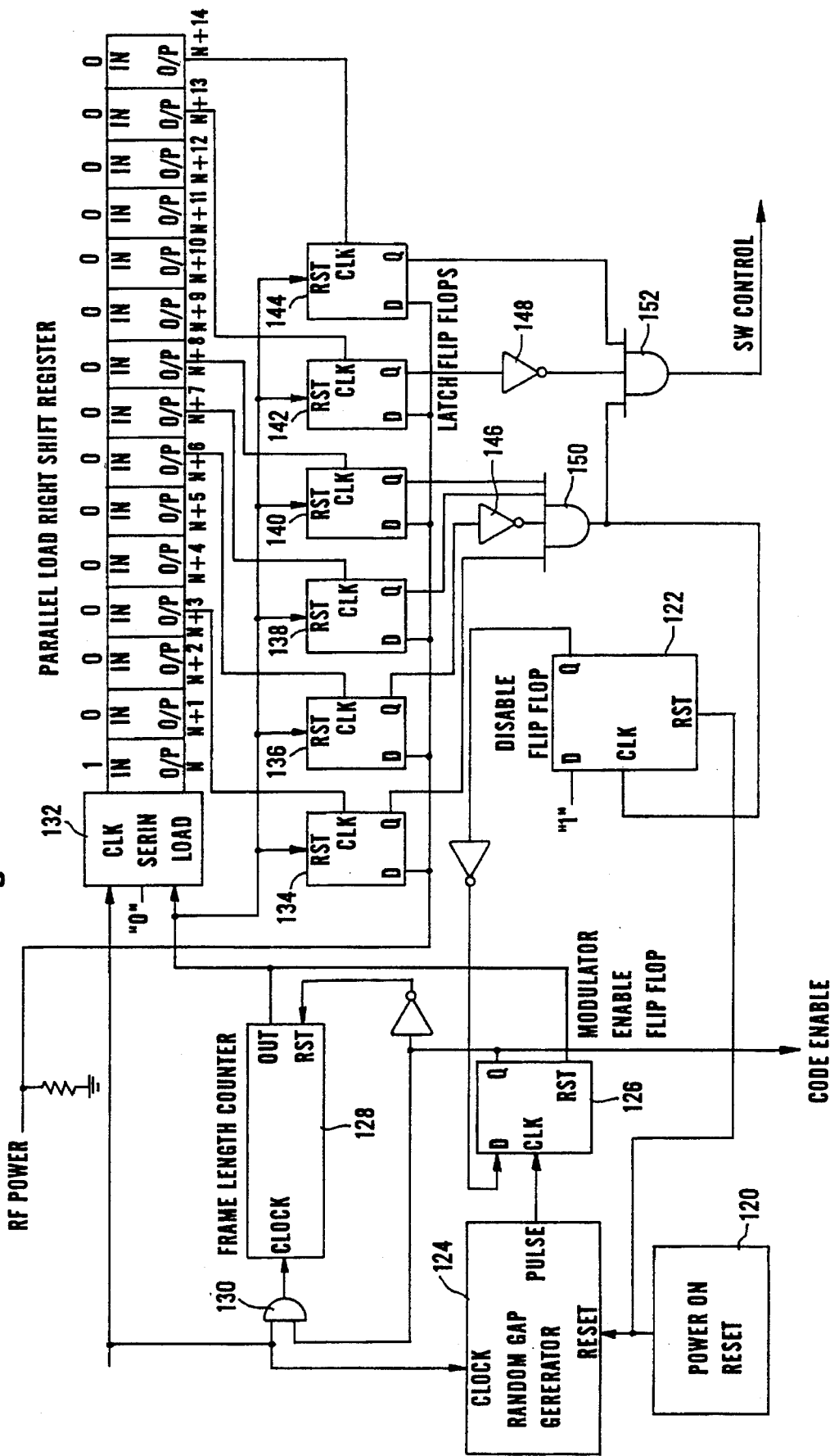
FIG. 9 is a schematic diagram of the gap detection logic circuit of FIG. 8.

FIG. 9 is a schematic diagram illustrating the gap detection logic circuit 116 of FIG. 8 in greater detail. The circuit has two inputs and two outputs, corresponding to the inputs and outputs shown in FIG. 8.

The inputs are a "clock" input for receiving the transponder clock signal and an "RF power" line to monitor the presence of received RF power from the interrogator. The outputs of the circuits are a "code enable" output to the code generator 112, and a switch control output "SW control" for controlling the controllable switch S1.

When power is initially applied to the gap detection logic circuit 116, a power-on reset circuit 120 applies a reset signal to a disable flip flop 122 and resets a random gap generator circuit 124. The random gap generator circuit 124 provides an output pulse to a modulator enable flip flop 126 after a pseudo random delay, effectively changing the spacing between successive data transmissions from the transponder. A random number generator in the random gap generator circuit is seeded each time a reset signal is received from the power-on reset circuit 120. The modulator enable flip flop 126 is configured to start in a reset condition, providing a reset signal to a frame length counter 128 which measures and controls the length of codes transmitted by the code generator 112.

The Q output of the disable flip flop 122 is fed to the D input of the modulator enable flip flop 126. The random gap generator 124 generates an output pulse at pseudo random spacing which toggles the modulator enable flip flop 126. If the D input of this flip flop is high, its Q output becomes high. This serves as a "code enable" signal, enabling the code generator 112. This output is also fed to an AND gate 130, which allows the transponder clock signal to the fed to the frame length counter 128, which records one count for each incoming clock pulse as the code generator 112 outputs the transponder's identification code sequence. At the end of the code sequence, the frame length counter overflows, providing a reset signal to the modulator enable flip flop 126. This removes the "code enable" signal from the Q output of the modulator enable flip flop 126, and enables a parallel load right shift register 132, which is loaded with a sequence of zero's except for the first bit (the leftmost bit in FIG. 9), which is loaded with a one. Each of six latch flip flops 134 to 144 is reset by the output signal from the frame length counter 128.

The serial input of the shift register 132 is held at logic "zero" and a shift register is so arranged that for each clock pulse the loaded "1" shifts one location to the right. The outputs of the shift register are so connected as to clock the latch flip flops at the appropriate clock cycle corresponding with the timing diagram of FIG. 7. The D inputs of the latch flip flops 134 to 144 are connected to the "RF power" line of the circuit, and the latches either record a "1" or a "zero", depending on the state of the "RF power" line when the "1" propagating along the shift register clocks the appropriate latch.

Should the interrogator have received a perfect identification code from the transponder and have modulated the interrogation signal with an appropriate interruption on turn-off signal, the state of the latch flip flops 134 to 144 will correspond to a predetermined sequence of 1's and zeros, which is decoded by several gates comprising invertors 146 and 148, and multiple input AND gates 150 and 152. When the correct turn-off modulation is received, a rising edge is output by the AND gate 150, which is fed to the clock input of the disable flip flop 122, disabling further toggling of the modulator enable flip flop 126. If a second turn-off signal is detected, the output of the AND gate 152 goes high, raising the "SW control" output, and disabling the onboard clock generator of the transponder.

Figure 10:
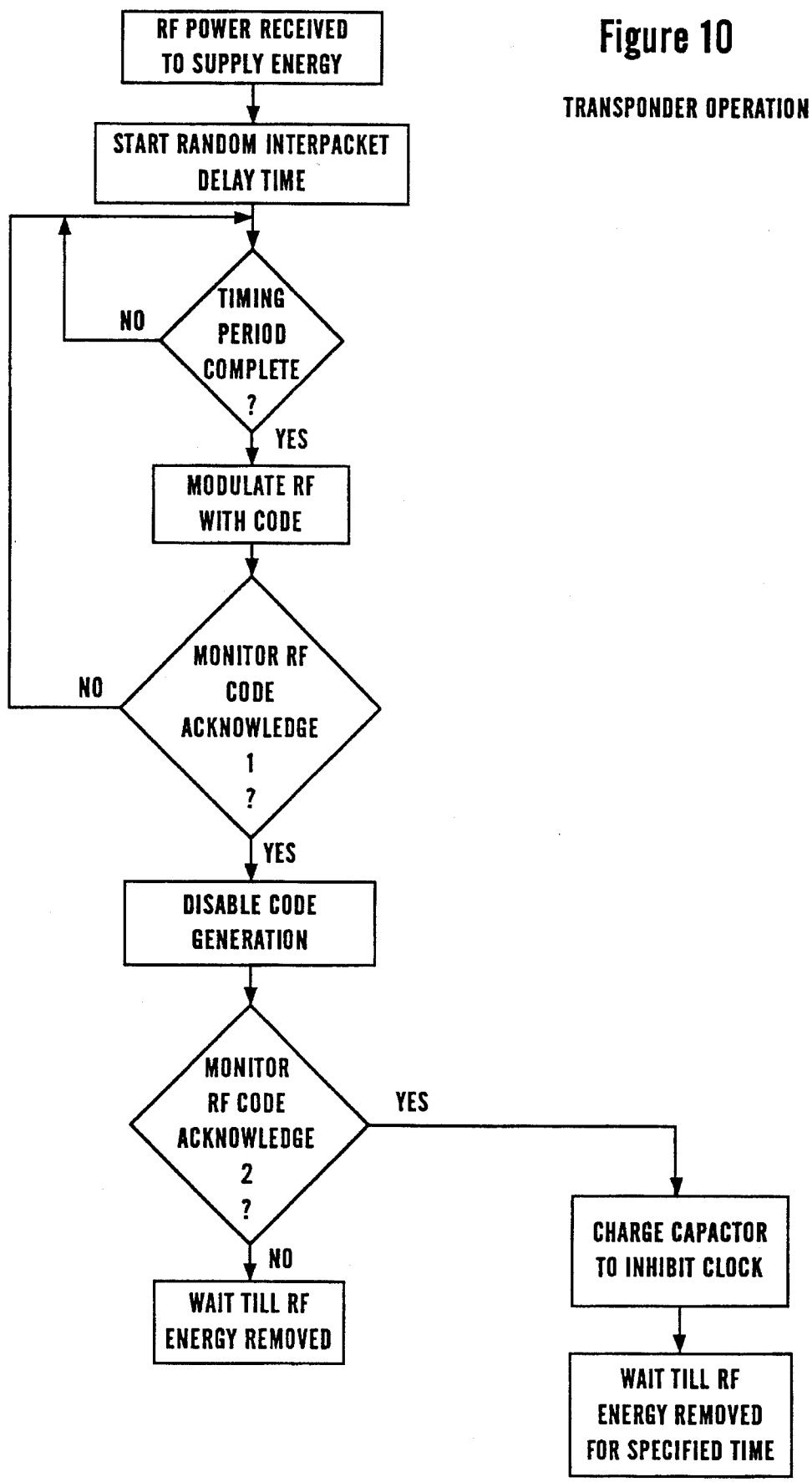
FIG. 10 is a flow chart illustrating the operation of the transponder of FIG. 8.

FIG. 10 shows the operation of the above described version of the operation of the transponder in a flow chart format.

The technology described above with reference to FIGS. 8 and 9 can also be applied to theft prevention application, where the transponders of the invention are used to "tag" articles of merchandise in a retail outlet. In such an application, an interrogator at a till or check-out transmits interrogation signals to transponders in respect of articles of merchandise, and effectively sends turn-off signals to these transponders when they are successfully identified. By means of similar circuitry to that described in FIGS. 8 and 9, the transponder is disabled for a predetermined period (say, ten minutes). The customer then passes through an exit at which a second interrogator is located. Those transponders which have been disabled by correct processing at the check-out will not respond to the interrogation signals from the interrogator at the exit. However, transponders in articles which have been shoplifted will be detected by the interrogator at the exit, which can generate an appropriate alarm signal.

The transponders described above are relatively robust and inexpensive, and can be applied to a variety of different articles, as mentioned above. In most cases, a single interrogator would not be required to identify transponders associated with completely different types of articles. For example, an interrogator used in a supermarket for stocktaking purposes would not be required to identify motor vehicles. If each interrogator were required to identify all possible transponders, an unacceptably large amount of information would need to be stored in the interrogator, and the validation processing of the interrogator would become excessive. To cope with this situation, interrogators and transponders intended for use with different categories of articles are allocated codes of different lengths. For example, an identification system used in motor vehicle licence disc validation can be allocated codes which are 24 bits in length, which will not be interpreted as valid by an adjacent reader of vehicle registration numbers which operates with a 22 bit code. Even if transponders of the two systems are transmitting their response signals simultaneously, the random or pseudo-random delays between response signals will ensure that transponders of both systems will eventually be heard.

We claim:

1. An identification system comprising an interrogator and a plurality of transponders, the interrogator including transmitter means for transmitting an interrogation signal to the transponder, receiver means for receiving a response signal from the transponder, and processor means for identifying the transponder from data in the response signal; each transponder comprising receiver means for receiving the interrogation signal, a transponder clock generator, a code generator, transmitter means, and a modulator connected to the code generator, connected so that on receipt of the interrogation signal the transponder transmits a response signal containing data which identifies the transponder, the interrogator including means for detecting successful reception of a response signal from a transponder and for modifying the interrogation signal synchronously with the response signal to indicate successful reception of the response signal, and each transponder including means responsive to a respective modification of the interrogation signal to cease transmission of its response signal.

2. An identification system according to claim 1 wherein the interrogator includes clock extraction means for extracting a transponder clock signal from the response signal which is used to synchronise the modification of the interrogation signal with the response signal from the transponder.

3. An identification system according to claim 2 wherein the clock extraction means is adapted to generate a pseudo transponder clock signal which follows the frequency of the extracted transponder clock signal.

4. An identification system according to claim 3 wherein the clock extraction means includes a voltage controlled oscillator which generates the pseudo transponder clock signal, and extracted clock monitor means which monitors the presence of the extracted transponder clock signal and which controls the voltage controlled oscillator to maintain the frequency of the pseudo *transponder clock signal constant in the absence of the extracted transponder clock signal.

5. An identification system according to claim 4 wherein the interrogator includes timing reference means arranged to generate an output voltage for controlling the voltage controlled oscillator, the output voltage being related initially, when a transponder response signal is received, to the value of a synchronisation code in the transponder response signal.

6. An identification system according to claim 5 wherein the timing reference means is arranged to generate a voltage ramp, the voltage value reached by the ramp being related to the duration of a synchronisation bit in the transponder response signal.

7. An identification system according to claim 2 wherein the interrogator is adapted to modify the interrogation signal for a first predetermined number of transponder clock periods, a second predetermined number of transponder clock periods after successful reception of the transponder response signal by the interrogator.

8. An identification system according to claim 7 wherein the interrogation signal is modified by being interrupted.

9. An identification according to claim 7 wherein the transponder includes logic circuitry arranged to monitor the modification of the interrogation signal and to cause the transponder to cease transmission of its response signal only if the modification of the interrogation signal has a duration related to the duration of a predetermined number of transponder clock periods.

10. An identification system according to claim 9 wherein the transponder logic circuitry is arranged to monitor the modification of the interrogation signal over a period corresponding to a single transponder clock period.

11. An identification system according to claim 7 wherein the interrogator is adapted to modify the interrogation signal at least a second time for a third predetermined number of transponder clock periods, a fourth predetermined number of transponder clock periods after successful reception of the transponder response signal by the interrogator.

12. An identification system according to claim 11 wherein the transponder includes control means arranged to detect the second modification of the interrogation signal and to disable the transponder for a predetermined time after the transponder ceases to receive the interrogation signal.

13. An identification system according to claim 12 wherein the predetermined time is determined by a timing circuit comprising a charge storage device which is arranged to be charged by energy derived from the interrogation signal, and to be discharged at a controlled rate after the transponder ceases to receive the interrogation signal.

14. An identification system according to claim 1 wherein the modification of the interrogation signal comprises a transition which occurs at a controlled rate.

15. An identification system according to claim 1 wherein the responsive to a modification of the interrogation signal is adapted to disable the transponder for a predetermined period of time.

16. A transponder for an identification system comprising an interrogator and a plurality of transponders, said transponder comprising receiver means for receiving an interrogation signal, a transponder clock generator, a code generator, transmitter means, and a modulator connected to the code generator, connected so that on receipt of an interrogation signal the transponder transmits a response signal containing data which identifies the transponder, the transponder further comprising means responsive to modification of the interrogation signal synchronous with the response signal to produce an indication of successful identification of the transponder from said response signal, to cease transmission of said response signal.

17. A transponder according to claim 16 wherein the transponder includes logic circuitry arranged to monitor the modification of the interrogation signal and to cause the transponder to cease transmission of its response signal only if the modification of the interrogation signal has a duration related to the duration of a predetermined number of transponder clock periods.

18. A transponder according to claim 17 wherein the transponder logic circuitry is arranged to monitor the modification of the interrogation signal over a period corresponding to a single transponder clock period.

19. A transponder according to claim 16 wherein the means responsive to a modification of the interrogation signal is adapted to disable the transponder for a predetermined period of time.

20. A transponder according to claim 16 wherein the transponder includes control means arranged to detect a second modification of the interrogation signal and to disable the transponder for a predetermined period of time after the transponder ceases to receive the interrogation signal.

21. A transponder according to claim 19 wherein the predetermined time is determined by a timing circuit comprising a charge storage device which is arranged to be charged by energy derived from the interrogation signal, and to be discharged at a controlled rate after the transponder ceases to receive the interrogation signal.

22. A transponder according to claim 20 wherein the predetermined time is determined by a timing circuit comprising a charge storage device which is arranged to be charged by energy derived from the interrogation signal, and to be discharged at a controlled rate after the transponder ceases to receive the interrogation signal.

23. An interrogator for an identification system comprising an interrogator and a plurality of transponders, the interrogator including transmitter means for transmitting an interrogation signal to the transponder, receiver means for receiving a response signal from the transponder, and processor means for identifying the transponder from data in the response signal; the interrogator detecting successful reception of a response signal from any transponder to derive a synchronisation signal from the response signal of that transponder and to modify the interrogation signal synchronously with the response signal to indicate successful reception of the response signal.

24. The interrogator of claim 23 in which the interrogator includes clock extraction means for extracting a transponder clock signal from the response signal which is used to synchronize the modification of the interrogation signal with the response signal from the transponder.

25. The interrogator of claim 24 in which the clock extraction means generates a pseudo transponder clock signal which follows the frequency of the extracted transponder clock signal.

26. The interrogator of claim 25 in which the clock extraction means includes a voltage controlled oscillator which generates the pseudo transponder clock signal, and extracted clock monitor means which monitors the presence of the extracted transponder clock signal and which controls the voltage controlled oscillator to maintain the frequency of the pseudo transponder clock signal constant in the absence of the extracted transponder clock signal.

27. The interrogator of claim 26 in which the interrogator includes timing reference means arranged to generate an output voltage for controlling the voltage controlled oscillator, the output voltage being related initially, when a transponder response signal is received, to the value of a synchronisation code in the transponder response signal.

28. The interrogator of claim 27 in which the timing reference means is arranged to generate a voltage ramp, the voltage value reached by the ramp being related to the duration of a synchronisation bit in the transponder response signal.

29. The interrogator of claim 24 in which the interrogator modifies the interrogation signal for a first predetermined number of transponder clock periods, a second predetermined number of transponder clock periods after successful reception of the transponder response signal by the interrogator.

30. The interrogator of claim 29 in which the interrogation signal is modified by being interrupted.

31. The interrogator of claim 29 in which the interrogator modifies the interrogation signal at least a second time for a third predetermined number of transponder clock periods, a fourth predetermined number of transponder clock periods after successful reception of the transponder response signal by the interrogator.

32. The interrogator according to claim 23 in which the modification of the interrogation signal comprises a transition which occurs at a controlled rate.

\* \* \* \* \*